UNITED STATES PATENT OFFICE.

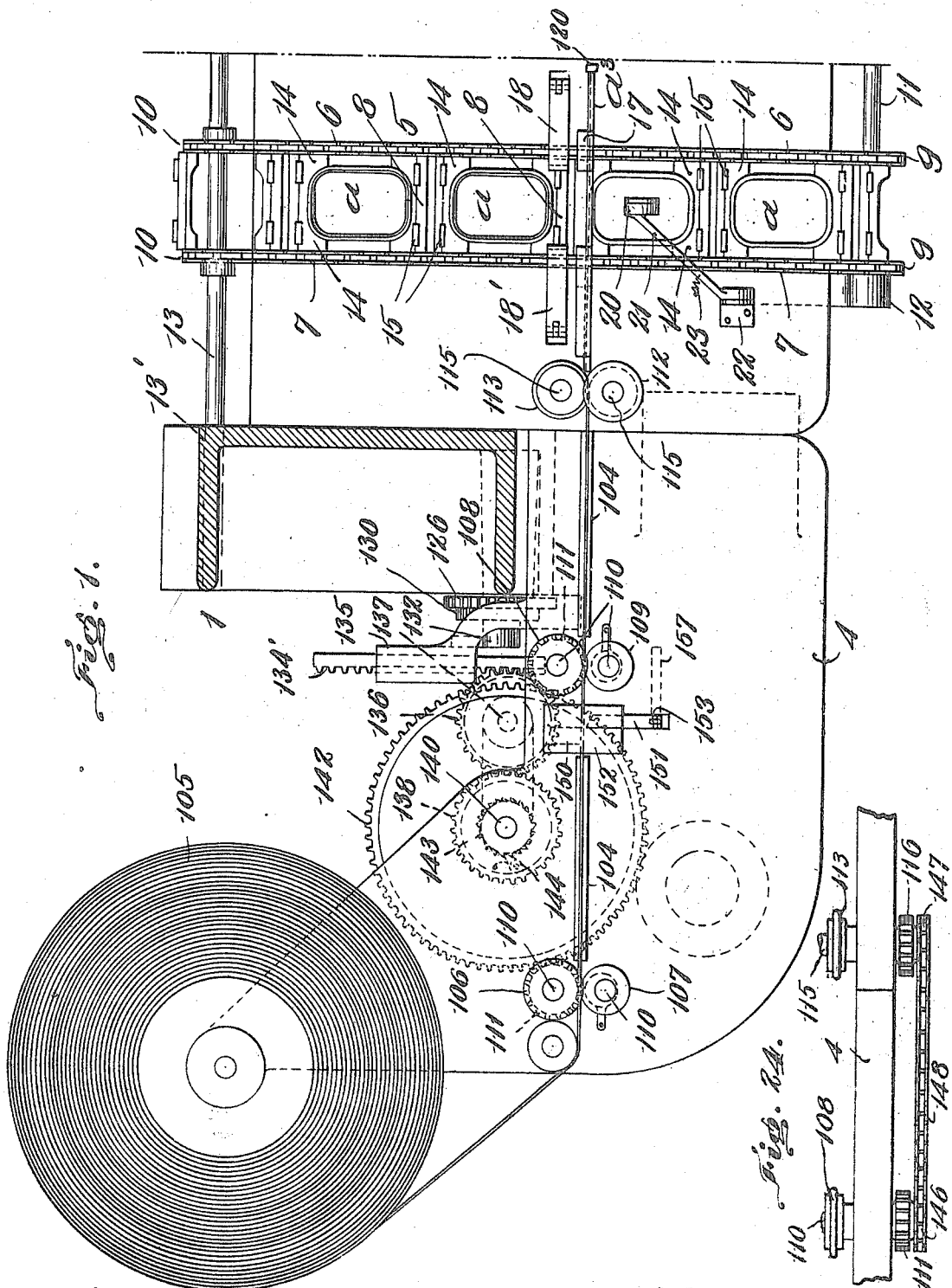

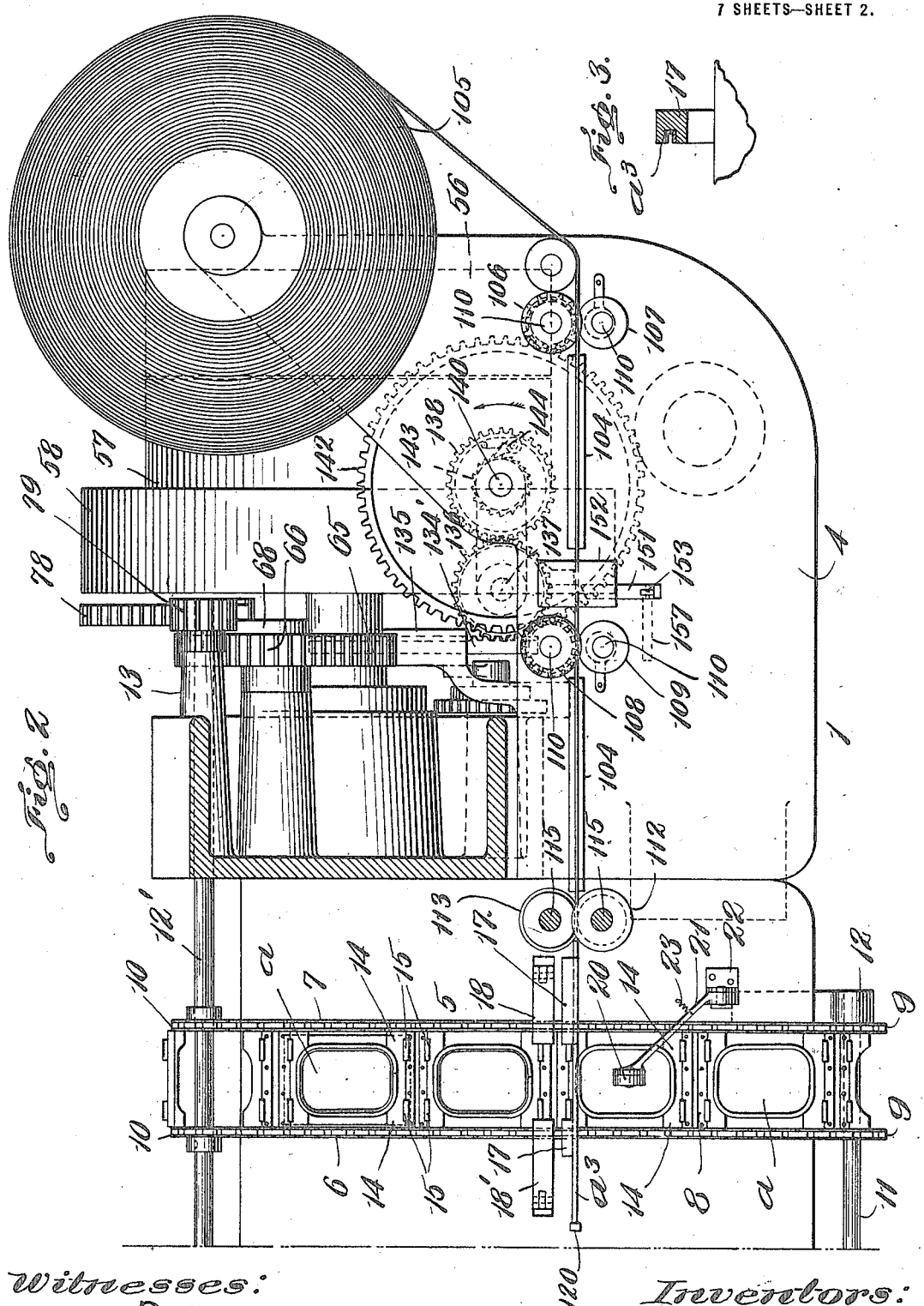

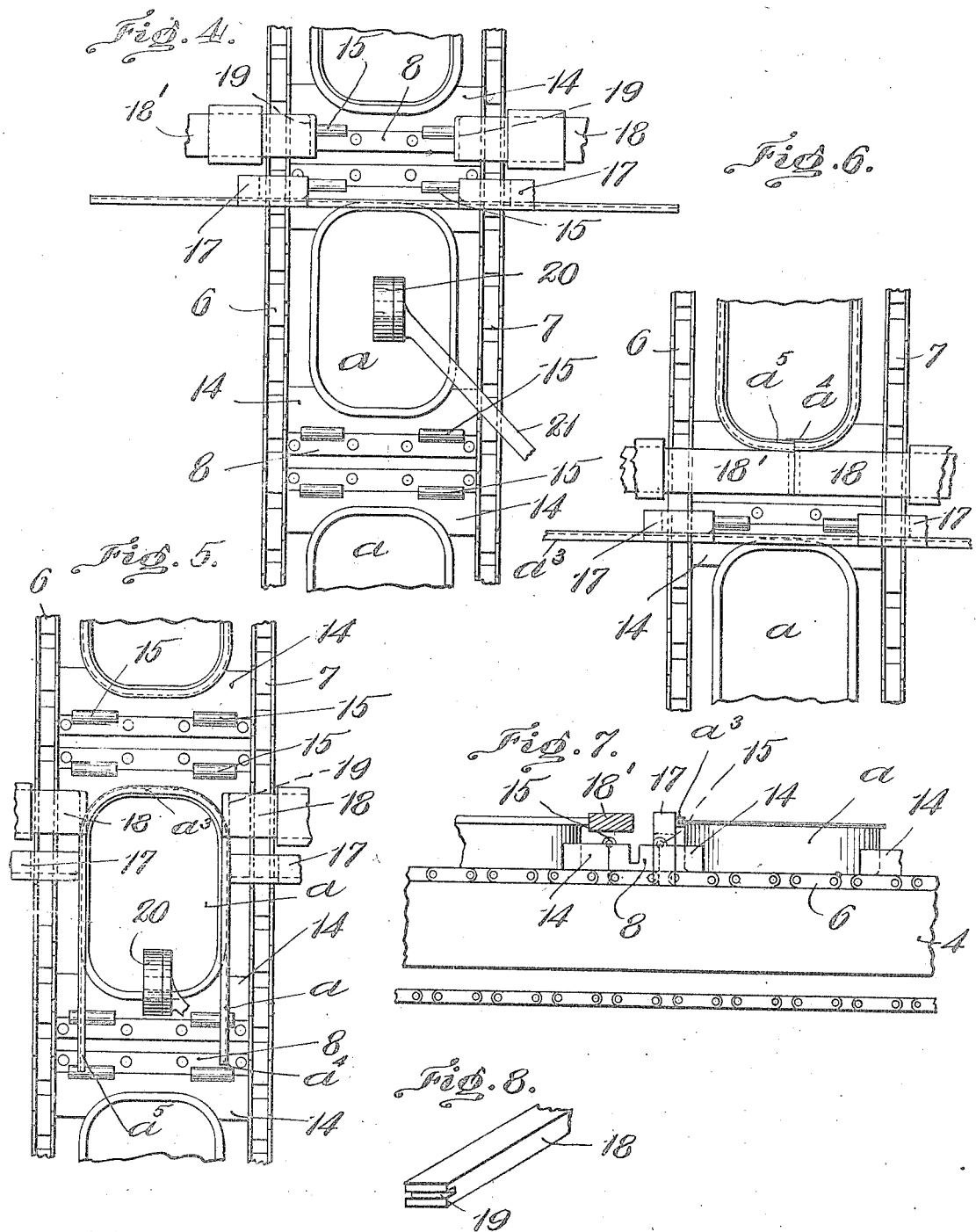

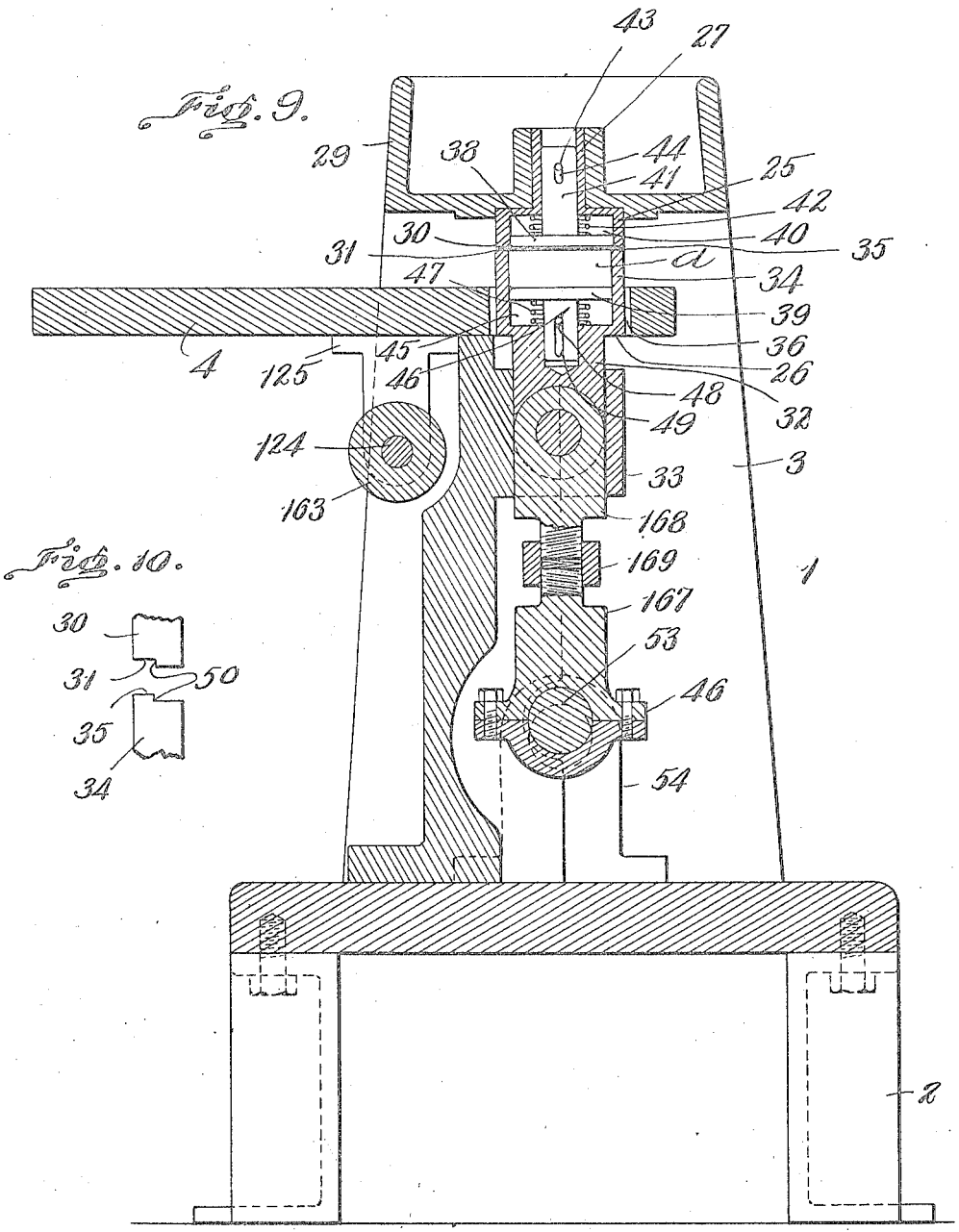

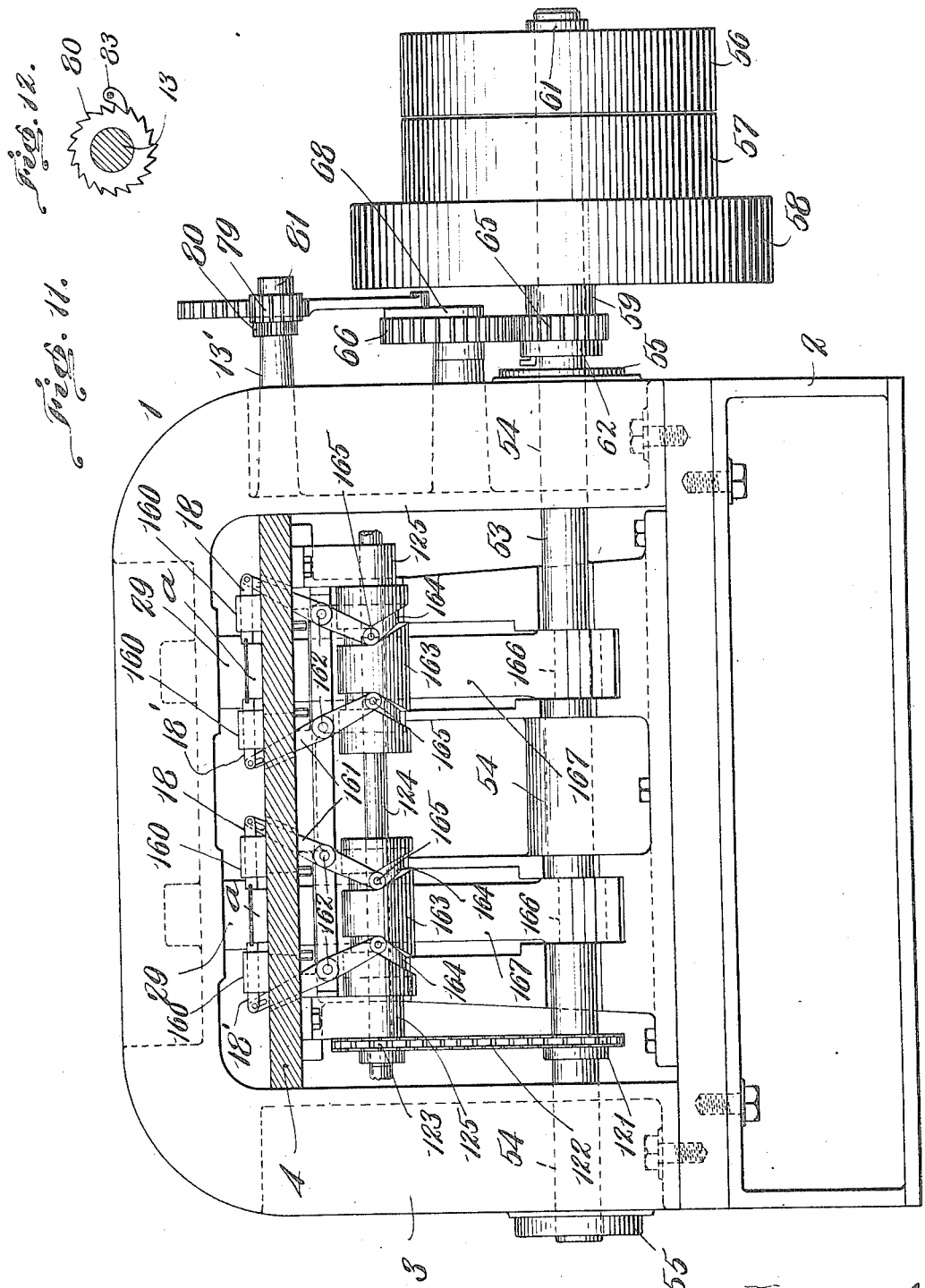

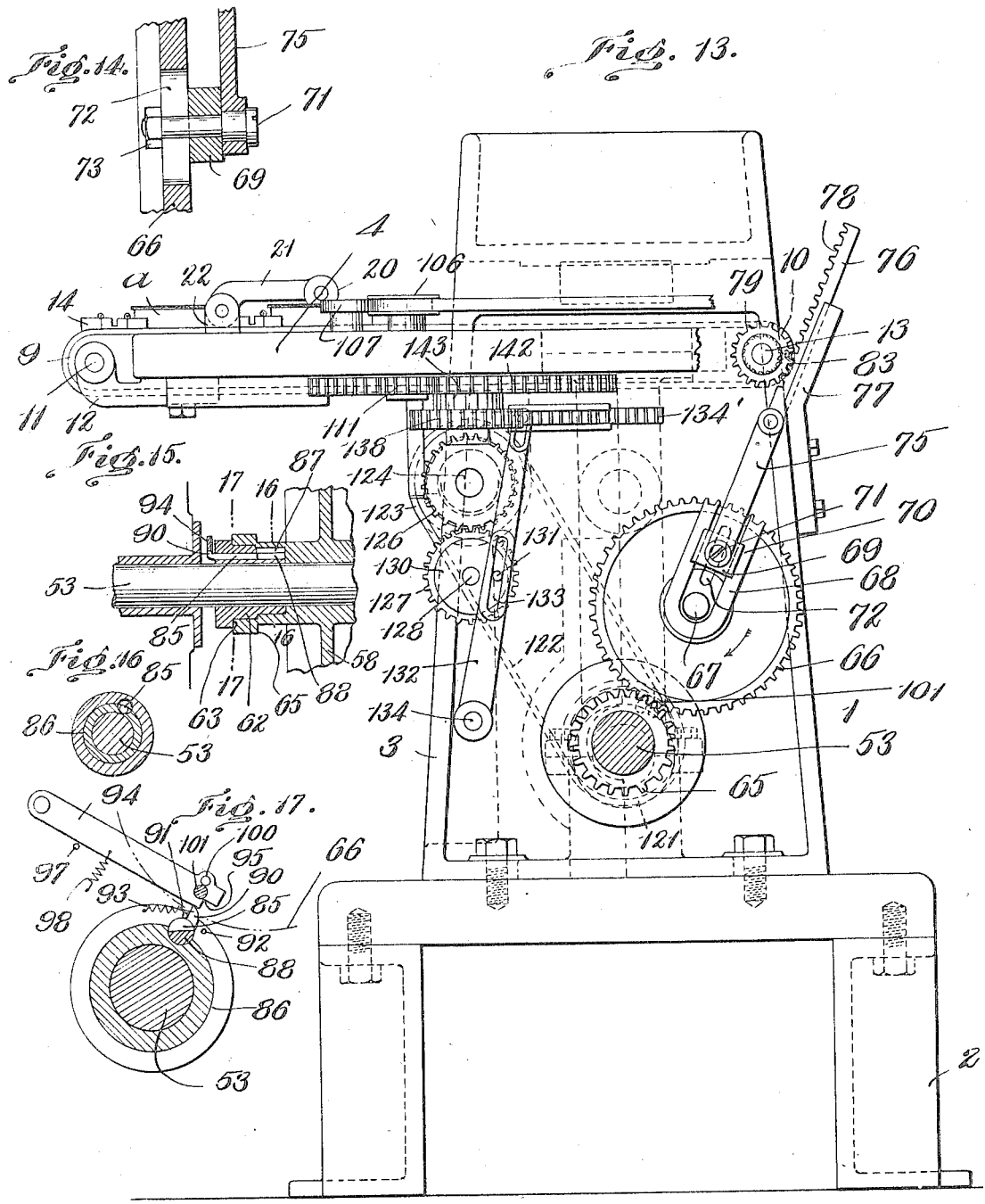

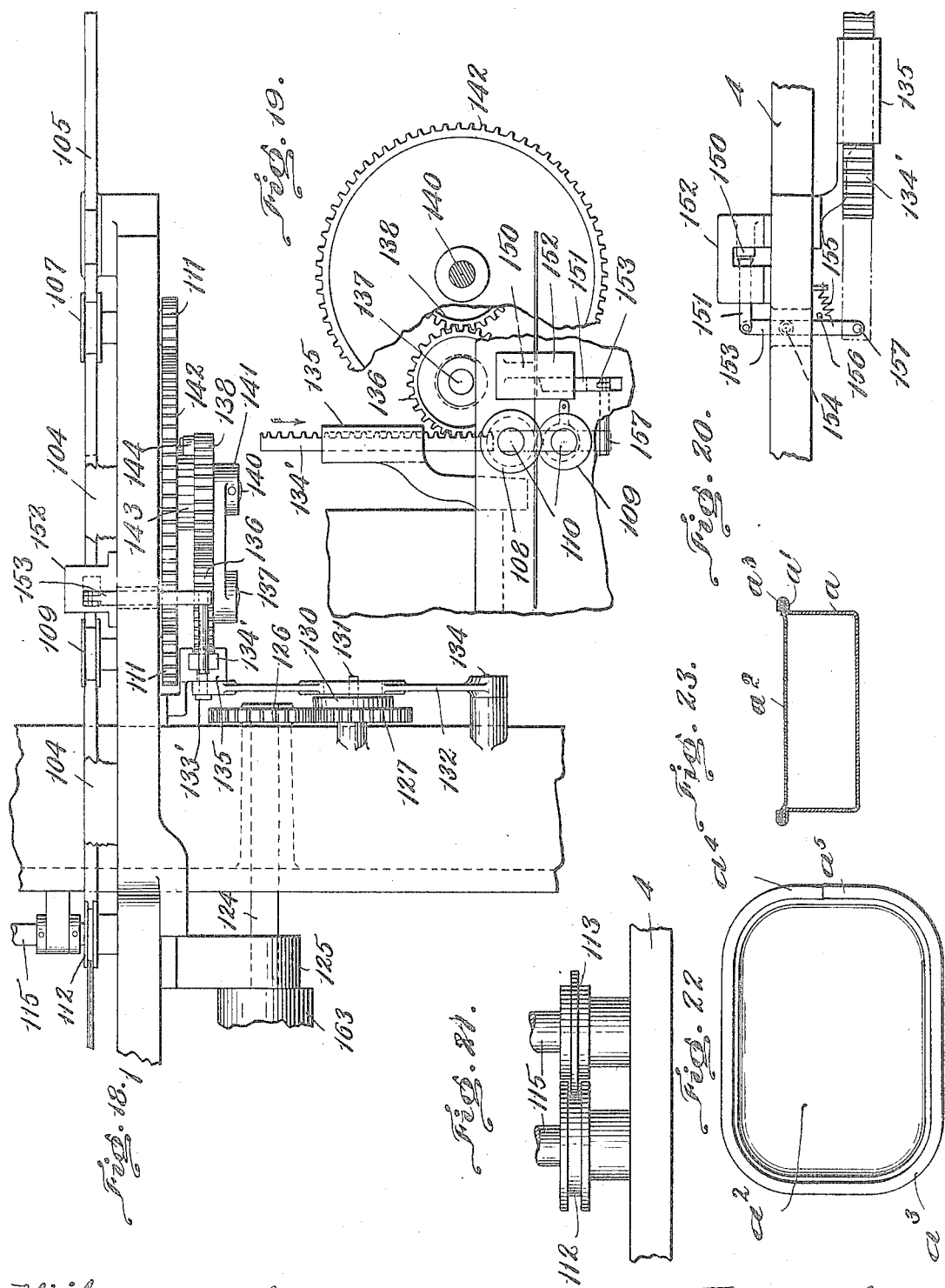

HANS CHRISTIANSEN, OF BEDFORD, AND JOHN P. GUPPEY, OF BOSTON, MASSACHUSETTS, ASSIGNORS, BY MESNE ASSIGNMENTS, TO THE BOWERS CAN SEAL COMPANY, OF BOSTON, MASSACHUSETTS, A CORPORATION OF MASSACHUSETTS.

CAN-SEALING MACHINE.

1,207,370. Specification of Letters Patent. Patented Dec. 5, 1916.

Application filed October 23, 1913. Serial No. 796,961.

*To all whom it may concern:*

Be it known that we, HANS CHRISTIANSEN, of Bedford, in the county of Middlesex and State of Massachusetts, and JOHN P. GUPPEY, of Boston, in the county of Suffolk, in said State, both citizens of the United States, have invented a new and useful Improvement in Can-Sealing Machines, of which the following is a full, clear, and exact description, reference being had to the accompanying drawings, forming a part of this specification, in explaining its nature.

The present invention relates to a can sealing machine operating to apply a sealing strip to a can body and cover which present laterally-projecting edges overlapping one another and to which the sealing strip is applied for binding these edges together and thereby hermetically sealing the can. Such type of can is shown in Letters Patent of the United States issued to John C. Bowers October 1, 1907, No. 867,239, and it is to the sealing of a can of this type that the present invention essentially pertains.

The special object of our invention is to provide a machine that will not only securely apply the strip to the overlapping edges of the can and cover, but will accomplish this effect with rapidity so that a large number of cans may be sealed within a relatively short time, which is a consideration of the utmost importance.

The machine embodying our invention can best be seen and understood by reference to the drawings, in which—

Figures 1 and 2 represent a plan of the machine. In this connection it should be understood that the machine shown is a twin machine consisting of duplicate parts operated from a single source of power. It is accordingly for purposes of expediency that the complete machine is shown in two separate figures. Fig. 3 is a view partly in elevation and partly in section of certain strip holding members to which reference will later be made. Figs. 4, 5 and 6 are plans of a portion of the carrier for the cans together with other coöperating parts and are for the purpose of illustrating the manner in which the strip is initially applied to the can. Fig. 7 is a view mainly in side elevation of a portion of the carrier and means for holding a can thereon. Fig. 8 is a view in perspective of a portion of one of the strip applying members which assist in the application of the strip to the can, which will later be explained. Fig. 9 is a cross vertical section of a portion of the machine. Fig. 10 is a side elevation of certain parts of a press which assist in the application of the sealing strip to the can. Fig. 11 is a front elevation of a portion of the machine showing various of its operating parts. Fig. 12 illustrates a detail of mechanism shown in Fig. 11 and to which special reference will later be made. Fig. 13 is a side elevation of a portion of the machine showing the construction and arrangement of various of its operating parts. Fig. 14 is a view mainly in vertical section of a detail of construction shown in Fig. 13. Fig. 15 is a longitudinal vertical section of a clutch arrangement to which special reference will later be made. Fig. 16 is a cross section on the line 16—16 of Fig. 15. Fig. 17 is a cross section on the line 17—17 of Fig. 15. Fig. 18 is a front elevation of a portion of the operating mechanism shown in Fig. 13. Fig. 19 is a plan of a portion of the mechanism shown in Fig. 18. Fig. 20 is a detail plan of a cutting mechanism, otherwise shown in Figs. 18 and 19. Fig. 21 is a side elevation of certain strip forming and feeding rolls to which reference will later be made. Fig. 22 is a plan of a can like that to which the present machine essentially pertains. Fig. 23 is a section of the can, the view showing the body of the can, cover and sealing strip thereon. Fig. 24 is a view in side elevation of a detail of construction forming a part of the strip feeding and forming mechanism to which reference will later be made.

The embodiment of our invention as shown in the present machine is one which is especially adapted for the application of a sealing strip to a generally rectangular-shaped can having rounded corner edges, although of course the machine might be used for the sealing of other forms of cans.

For purposes of illustration accordingly we have employed that type of can for the sealing of which the machine is especially adapted and which is shown in Figs. 22 and 23 of the drawings.

$a$ represents the body of the can; $a^1$ the laterally-projecting flanged edge thereof.

$a^2$ is the cover presenting an edge overlapping the flanged edge of the body of the can.

$a^3$ is the sealing strip which it will be observed is of a substantially U form in cross section.

$a^4$ and $a^5$, respectively, are the ends of the strip and which are thus referred to for the reason that the length of the sealing strip is such that these ends will overlap on the can so as to make a tight joint.

Referring to the drawings:—1 represents the body or main supporting structure of the machine, the same consisting of a base piece 2, frame 3 and table 4 supported by it. Mounted upon the frame and table of the machine are the various mechanisms operating to apply the sealing strips to the cans and to thereby seal the cans. In describing these various mechanisms reference will first be made to that mechanism which carries the cans and during the operation or travel of which the sealing strips are applied to the cans. This mechanism consists of endless carriers 5 which pass around and over the face of the table. Each of these carriers consists of a pair of sprocket chains 6 and 7, respectively, connected by bars 8 which extend transversely between and are secured to opposite links of the respective chains. These connecting bars are spaced the same distance apart in the longitudinal direction of the travel of the chains and between them the cans are held to be carried over the face of the table, as will later be explained. The chains pass around the table by their extension over sprocket wheels 9 and 10, respectively. The sprocket wheels 9 are fixed to an idler shaft 11 turning within bearings 12 fixed at the forward edge of the table. The sprocket wheels 10 are fixed to a shaft 13 which turns within bearings 13' fixed at the rear edge of the table. The shaft 13 is a power-driven shaft and through it and the sprocket wheels 10 power is applied to the respective carriers by which the same are operated to run around the table.

The cans are held to be borne by the carriers by spaced socket-forming members 14 fastened, respectively, by spring hinges 15 to the transverse bars 8 secured to the respective chains as aforesaid. The members 14 are hinged to lie upon opposite sides of each of the transverse bars 8 and are incised to conform to the shape of the ends of the body of the can. The disposition and arrangement of these parts is otherwise such that a can or can body may fit in the space between the bars of the carrier to rest upon the face of the table and be held securely by the members 14 against lateral and longitudinal displacement during the travel of the carriers, which operate to draw the cans transversely over the face of the table, the cans sliding thereon during such movement.

The travel of the carriers and cans is an intermittent one with a dwell between each step or period of movement over the face of the table. These dwells are shown in Figs. 1 and 2 by the positions of the cans away from and with relation to the front edge of the table, and may also be defined in the light of the operations which take place. In the first position of dwell, or that in which the cans are nearest the front edge of the table, the cans are placed within the carrier between the holding members 14. The cans are then moved to the second position of dwell where they assist, as will later be explained, in holding the sealing strips preparatory to their initial application to the cans. During the movement of the carriers and cans from the second to the third position of dwell the sealing strips are initially applied to the cans. In the third position of dwell a secondary operation of applying the sealing strips to the cans is effected. The cans are then moved to a fourth position of dwell. During this dwell the operation of applying the sealing strips is completed, after which a further step of the carriers tends to throw out the sealed cans as the carriers turn downwardly around the rear edge of the table. It should be understood that these operations are referred to in the light of single cans merely for the purposes of illustration. In actual practice cans are being continuously supplied to the carriers and each carrier is continuously bearing a line of four cans, each can being operated upon in precisely the same manner, but at any step or dwell different operations may be simultaneously taking place on different cans.

Before describing the operating parts of the machine in detail, reference will first be made to the manner in which the sealing strip is applied to the can, and which comprises an initial and secondary operation.

Assuming the can to have been moved by the carrier to the second position of dwell, as above referred to, the sealing strip which is to be applied to the can is then interposed between the forward flanged edge of the can and members 17. These members are fixed to the table alongside the carrier chains and extend over these chains. The members are parallelly and oppositely arranged and are spaced from one another a distance substantially equal to the transverse width of the top of the can after the strip has been applied to it. They form with the forward flanged edge of the can a three-point contact for retaining the sealing strip as aforesaid. In this connection it is also to be observed, by reference to Fig. 3, that the inside faces of these holding members are grooved to receive the sealing strip $a^3$ which is a straight strip substantially U-shaped in cross section, the back of the strip fitting within the grooves of the members 17 while the forward flanged edge of the can fits within the groove of the strip (see Fig. 4).

The strip $a^3$ is centrally disposed with relation to the longitudinal center of the can. In other words, the disposition, form and arrangement of the can with relation to the strip is such that as the can is moved forward by the carrier one step to pass between the members 17, the pressure of the can against the strip will tend to bend the same and the strip will be wrapped around the flanged edge of the can and assume a shape substantially as shown in Fig. 5, where it will be observed that the strip has become wrapped around the forward flanged edge of the can and along either side thereof, but has not been wrapped around the rear flanged edge of the can.

As the forward movement of the can continues it not only moves between the members 17, which tend to bind the strip along the sides of the can, but also between the inner grooved ends of oppositely-arranged movable wrapping members 18, 18'. These members normally occupy a stationary position where the grooved inside ends 19 thereof (see Fig. 8) will draw against the strip along the parallel side edges of the can as the can is moved to pass between them, which assists in tightly applying the sealing strip to the can.

During the movement of the can from the second to the third position of dwell it is held against vertical displacement to rest securely on the face of the table over which it is sliding by a roller bearing 20 bearing against the top or cover of the can. This roller bearing is borne by an arm 21 pivotally secured to a member 22 fixed to the table. The arm 21 is retained by a spring 23 interposed between the arm and the table and by which the roller bearing 20 is retained to tensionally bear against the can, as it passes beneath the same. When the can has reached the next, or third position of dwell it has then reached a position where the rear flanged edge thereof is just beyond the wrapping members 18, 18'. Thereupon these members, as will later be explained, are simultaneously moved inwardly and tend to bend the ends $a^4$, $a^5$ (see Fig. 5) of the strip around the rear curved flanged end of the can, thereby completing the wrapping of the strip around the can (see Fig. 6).

Owing to the fact that the ends $a^4$, $a^5$ of the strip overlap one another on the can, the operation of the wrapping members, as will later be explained, is such that one of the wrapping members, the member 18 applying the underlapping end $a^4$ of the strip to the can, will have completed its operation before the member 18', and will have also a slight reverse movement. After such reverse movement the member 18', or that which applies the over-lapping end $a^5$ of the strip to the can and which has lagged, will then complete its operation, when the parts will appear substantially as shown in Fig. 6.

When the can has reached its fourth position of dwell, following the next step of the carrier, pressure is applied to the sealing strip by a press which binds the strip tightly against the flanged edge of the can and hermetically seals the can. This press is illustrated in Fig. 9 and consists essentially of active and passive members 25 and 26, respectively. Of these members the member 25 is a fixed member or head carried by a vertical stud 27 secured to a frame extension 29, which extends above the table. The member 25 lies above the face of the table so that the cans as they are borne by the carrier may pass beneath the same. The member 25 is also centrally disposed above the can occupying the fourth position of dwell of those above referred to. The member 25 is provided with a downwardly-projecting flange or rim 30 shaped to conform to the plan of the exterior flanged edge of the can and presenting an under-bearing surface 31 adapted to engage the upper side of the sealing strip applied to the can as aforesaid.

The movable complementary presser member 26 is borne by a plunger 32 mounted in a bracket 33 fixed to the frame and providing a bearing or way in which the plunger 32 has a vertical reciprocatory movement. The member 26 is provided with an upwardly-projecting flange or rim 34 shaped to conform to the plan of the flanged edge of the can and presenting an upper-bearing edge 35 adapted to engage the under side of the sealing strip applied to the can. The normal inactive position of the member 26 is one below the face of the table within an opening 36 therein, which permits of the cans being advanced into their fourth position of dwell beneath the presser head 25.

In order that the cans may be held securely in place and properly centered during the upward and reverse movement of the movable presser member 26 there are provided clamping plates or pads 38 and 39, respectively, and which are carried by the respective presser members. Of these clamping plates, the plate 38 is located to occupy a normal position at the lower end of the cavity or recess 40 in the upper presser member, the under-bearing face thereof lying preferably just below the bearing edge 31 of this member. The plate is fixed to a vertical post 41 which slides within a socket formed in the vertical stud 27. Wrapped around the post 41, between the lower end of the stud 27 and the clamping plate, is a spring 42. Fixed to the stud 27 is a pin 43 which extends into a slot 44 in the post 41, the arrangement being such that the spring will operate to tensionally hold the plate in its normal position, the bearing of the pin 43 against the lower end of the slot 44 defining such position. Upon the application of pressure to the under side of the clamping plate it will be moved upwardly into the cavity 40 in the head so that the under-bearing face of the plate will lie above the pinching edge 31 of the presser member.

The clamping plate 39 of the member 26 is located to occupy a normal position at the upper end of the cavity or recess 45 in the presser member 26, the top-bearing face thereof being substantially flush with the face of the table and edge 35 of the presser member. The plate is borne by a vertical post 46 contained to slide within a socket formed in the plunger 32. Wrapped around this post, between the top end of the plunger 32 and the clamping plate 39, is a spring 47, the tension of which operates to hold the clamping plate in its normal position, which is defined by a pin 48 projecting from the plunger 32 to enter a slot 49 in the post and engage the same at the bottom end of the slot. It is evident that upon the application of pressure to the upper side of the presser plate 39 the spring 47 may be compressed and the clamping plate moved, into the cavity 45 in the presser member.

The operation of these parts is as follows: When a can has reached the fourth position of dwell beneath the presser member or head 25 it will then rest upon the clamping plate 39. The operation of the machine is then to lift the presser member 26 and clamping member 39 with it, and the can will be held clamped between the clamping members 38 and 39, respectively. As the upward movement of the presser member 26 continues the socket-forming members 14 which are holding the can will be moved upwardly on their hinged supports out of the way, when the rim 34 will embrace the body of the can rising above the clamping member 39. This movement is permissible by reason of the cavity 45 in the presser member, which is of considerable depth, the spring 47 becoming of course compressed. The upward movement of the presser member 26 then continues until the bearing edge 35 thereof engages the under side of the sealing strip when the can will become lifted until the upper side of the sealing strip engages the bottom-bearing edge 31 of the presser member 25. Thereupon the sealing strip will become pinched between the edges 31 and 35 of the respective presser members and thereby compressed onto the flange of the can, hermetically sealing the same.

In order that the sealing strip may be locked onto the flange of the can, the pinching edges 31 and 35 of the respective presser members are preferably provided each with a shoulder 50 substantially as shown in Fig. 10 which tends to imprint a like shoulder in the sealing strip and flange of the can, locking the strip thereon as referred to in said patent. After the pinching of the sealing strip, the operation of the machine tends to reverse the presser member 26, the rim 34 thereof dropping back to its normal position. During such movement the holding members 14 will also be returned to embrace the can, being actuated to so do by their spring-hinge connections 15. When the presser member 26 has returned to its normal position the clamping members 38 and 39 will then have released the can which is left resting upon the top face of the clamping member 39 and socketed within the holding members 14 in position to be carried forward by the carrier during the next step of movement.

The parts of the machine thus far referred to have been those parts which act directly upon the can for applying the sealing strip thereto. These parts have been described not only in the light of their construction but also their operation in order that a proper understanding may be had of the mechanisms controlling the operation of these parts, and especially since the mechanisms to be described are operating upon different cans or a series of cans at the same time and from a common source of power. In other words, mechanism is provided for simultaneously moving the carriers and cans by successive steps over the face of the table. Each period of dwell between the successive steps is availed of to effect the following operations, viz: forming the strips and feeding them into a position just forward of the can occupying the second position of dwell, whereby they may be applied to the can as it is moved forward; operating the wrapping members 18 which tend to bend the strips around the rear end of the can occupying the third position of dwell, and also operating the press to pinch the sealing strip on the can occupying the fourth position of dwell.

Reference will first be made to the manner in which power is applied for moving the carriers and cans by successive steps with intermittent periods of dwell. 53 is a shaft which turns in bearings 54 fixed to the main frame. The shaft 53 lies below the respective carriers and extends at right angles to the respective lines of their travel. It lies also directly beneath the cans occupying the fourth position of dwell. The shaft is held against longitudinal movement by collars 55 which engage the ends of the frame (see Fig. 11). Loosely mounted upon this shaft is an idler pulley 56 and also a driven pulley 57 fixed to a fly wheel 58 having a projecting hub 59. The respective pulleys and fly wheel are held against longitudinal displacement on the shaft by a collar 61 on the outer end of the shaft and also by a sleeve 62 keyed to the shaft, presenting a shoulder 63 against which the hub of the fly wheel has an endwise bearing (see Fig. 15).

Fixed to the hub 59 of the fly wheel is a gear 65 having toothed engagement with a gear 66 mounted to turn upon a stud 67 fixed to the frame of the machine. Carried by the gear 66 is a yoke 68 (see Fig. 13) the arms of which form a way in which is mounted a block 69 adjustable on the yoke in a radial direction toward or away from the axis of the gear 66. The adjustable retention of the block is provided for, as shown in Fig. 14, where it will be seen that the body of the block fitting between the arms of the yoke is provided with edges 70 which have an overlapping bearing against the exterior face of the arms. Extending through the block is a bolt 71 which extends also through a radial slot 72 cut in the body of the gear, and is secured on the reverse side thereof by a nut 73 which tends to clamp the block against the arms of the yoke, holding it securely in place in any adjusted position within the limits defined by the slot 72 in the gear.

Pivotally secured to the block, or rather to the bolt 71 securing the block, is a link or arm 75. This arm at its outer end connects with a rack bar 76 which is mounted to slide within a bracket 77 fixed to the frame and in position where the toothed edge 78 of the rack bar may have engagement with a gear 79 loosely mounted upon the shaft 13. Alongside the gear 79 is a ratchet wheel 80 fixed to the shaft 13, the gear 79 lying between the ratchet wheel and a fixed collar 81 by which the gear is held in place. Pivoted to the side of the gear 79 is a spring-pressed dog 83 adapted to engage the teeth of the ratchet wheel during the forward movement of the gear and to pass idly over the same during the reverse movement of the gear (see Fig. 12). In the operation of these parts just described, as the gear 66 is rotated from off the fly wheel it operates as a crank through the link 75 to reciprocate the rack bar 76, the bar being moved downward by a half revolution of the gear 66 and in a reverse direction during the remaining half revolution of the gear. During the downward movement of the rack bar motion is applied to the gear 79 and through the dog 83 thereon to the ratchet wheel 80 and shaft 13, which tends to move the respective carriers and cans through a single step of movement. In other words, the arrangement of the parts is such that each forward step of the carriers is commensurate with a half revolution of the gear 66 and as this gear is operating to impart a downward drawing impulse to the rack bar 76. During the remaining half revolution of the gear and upward throw of the rack bar no motion will be imparted to the shaft 13. Consequently the movement of the carriers ceases providing a dwell until the next half revolution of the gear imparts a downward movement to the rack bar and the carriers are moved thereby through another step of movement, followed by a dwell as the rotation of the gear continues.

The operations that are effected during the respective dwells of the carriers and cans are obtained through motion imparted to the shaft 53 for rotating it a single revolution of movement. The shaft 53 is rotated only during the time when the gear 66, through a half revolution thereof, is imparting an upward or reverse movement to the rack bar 76, which defines the period of dwell of the carriers and cans as aforesaid. Provision is made for rotating the shaft directly from the fly wheel through a clutch as follows:—By reference to Figs. 15 and 17 it will be seen that the projecting hub 59 of the fly wheel partly overlaps the sleeve 62 fixed to the shaft 53. Carried by the sleeve is a pin 85. This pin extends parallel with the shaft and in the plane or line of the joint 86 between the hub and sleeve. The joint 86 is provided with a hole or socket 87 for receiving the end 88 of the pin which projects into the same. The end 88 of the pin, however, which extends into the socket 87 between the hub and sleeve, is made semicircular in cross section so that it may be contained wholly within the sleeve when the pin is turned into what may be termed an inoperative position. The hub of the fly wheel will then rotate idly within the sleeve and impart no motion to the shaft 53. When the pin is turned into what may be termed an engaging position, the semi-circular end 83 thereof turning within its socket will cross the line of the joint between the hub and sleeve forming a connecting link between these parts, and they will be connected to rotate in unison. In other words, when the pin is in its engaging position the shaft 53 will be rotated directly from off the fly wheel.

The pin 85 is controlled in the following manner: The end of the pin, it will be observed by reference to Fig. 15, projects beyond the outer end of the sleeve 62 and is provided with a turned end 90 forming a lever for turning the pin. The engaging and disengaging positions of the pin 85 are determined by stops 91, 92, respectively, on the end of the sleeve. The pin is normally held in an engaging position against the stop 91 by a spring 93 connecting with the turned end 90 of the pin and fixed to the end of the sleeve (see Fig. 17).

Pivotally secured to the frame of the machine, in a position adjacent the turned end of the pin, is a lever 94. This lever is provided with a shoulder or edge 95. The disposition and arrangement of the lever are such that as the shaft 53 is rotated (assuming the parts to be in clutch engagement with one another), the turned end 90 of the pin will engage the shoulder 95 of the lever and be turned thereby against the tension of the spring 93 into an inoperative position, thereby releasing the clutch. This is the normal position of the lever. Such position is defined by a stop 97 located beneath the lever and fixed to the frame of the machine, while the lever is held yieldingly against this stop and in its normal operative position by means of a spring 98 connecting with the frame of the machine.

Projecting from the side of the lever 94 is a stud 100. Projecting also from the side of the gear 66 is a stud 101. The disposition and arrangement of these respective studs are such that as the gear 66 is rotated the stud 101 carried thereby will engage the stud 100 on the lever 94 to pass under the same and thereby lift the lever into a disengaging position. The shoulder 95 of the lever will then no longer bear against the turned end 90 of the pin 85 and the pin will be drawn by the spring 93 into an engaging position, making thereby clutch engagement between the respective parts. The disposition of the stud 101 on the gear 66 is such that this stud will engage the stud 100 upon the lever 94 and raise the lever into a disengaging position for throwing in the clutch precisely at the completion of that half revolution of the gear 66 when it is operating to move the carriers and cans as aforesaid a single step, or, in other words, at the commencement of that half revolution of the gear which defines the dwell of the carriers and cans. Moreover, the clutch engagement will continue during only a single revolution of the shaft 53 for after the stud 101 on the gear has passed from beneath the stud 100 on the lever, the lever will return to its normal engaging position and accordingly will engage the turned end 90 of the pin at the completion of such revolution, thereby throwing the pin into a disengaging position and releasing the clutch. It will also be seen that the complete rotation of the shaft 53 is commensurate with a half revolution of the gear 66, inasmuch as the gear 66 has a ratio of 2:1 with respect to the gear 65 by which it is rotated, and the rotation of which gear 65 is the same as that of the shaft 53. Rotation of the shaft 53 will accordingly be completed within each period of dwell, the clutch being released and the shaft 53 prevented from further movement at the instant when the gear 66 is beginning to impart a further step of movement to the carriers and cans.

Referring now to the strip feeding and forming mechanism, attention is first directed to the guideways 104 arranged to extend over the face of the table. The feed and forming mechanism will, however, be described in the light of one of these guideways inasmuch as the mechanism is the same for both. The guideway is slotted to receive a flat main strip of metal which may be drawn from a coil 105 or otherwise fed to the machine.

106, 107; 108, 109 are sets of feed rolls, the engaging edges of which are adapted to receive the strip and to feed the same forward through the guide. These rolls are mounted upon shafts 110 which extend through the table, being suitably mounted to turn thereon. To the shaft of each of the respective feed rolls 106 and 108 beneath the table is fixed a gear 111 by which the respective sets of feed rolls may be positively driven. Beyond the feed rolls are combined feed and forming rolls 112, 113, respectively. Of these rolls the roll 112 is provided with a substantially U-shaped groove, while the roll 113 has a corresponding curved peripheral edge, which enters the groove in the roll 112, the two rolls, in other words, coöperating with one another to bend the strip fed between them and impart to it a substantial U shape in cross section, or such shape as fits it for its initial application to the can. The rolls 112, 113 are each mounted upon a shaft 115 which extends through the table with suitable bearing therein. To the ends of the shafts 115 are fixed intermeshing gears 116 through which the rolls are driven, power being applied for operating the rolls, as will later be explained. It will also be seen that the rolls 112, 113 are located at the end of the guide and in a position where the sealing strip $a^3$ fed by and through them may enter between the can occupying the second position of dwell and the members 17, which together with the can form a three-point contact for holding the sealing strip preparatory to its application to the can by the advance movement thereof in the carrier, as before described.

During each dwell of the carriers and cans the feed rolls are positively driven to feed the main strip a distance precisely equal to the length of the strip applied to the can, this depending of course upon the size of the can. Between the two sets of feed rolls 106, 107; 108, 109 is located a cutting mechanism which operates to cut the main strip into proper lengths. The disposition and arrangement of the feed rolls and that of the combined feed and forming rolls in their relationship to one another and to the cutting mechanism and main strip are otherwise such that during each dwell of the carriers and cans and prior to the severance of the sealing strip the main strip will be fed forward by the combined sets of feed rolls to a position where the end of the main strip will lie just back of the rolls 112, 113 and about to enter these rolls. The strip is then severed by the cutting mechanism which operates at the end of the movement and leaving a severed strip reaching from the jaws of the cutting mechanism to a point just back of the feed and forming rolls 112, 113 as aforesaid.

During the next period of dwell the combined sets of feed rolls will operate to feed the main strip a distance equal to the length of the severed strip. The severed strip at the same time will be advanced by the feed rolls 106, 107 which are located beyond the cutting mechanism, and fed into the combined feed and forming rolls. These rolls will then operate to feed the severed strip into a position between the front flanged edge of the can occupying the second position of dwell and the members 17 forming with the edge of the can the three-point contact as aforesaid. The severed strip is then in position to be applied to the can. This position is otherwise fixed and defined by a stop 120 against which the end of the strip bears, after it has been fed out of the rolls 112, 113. It will accordingly be seen that the combined feed and forming rolls at one end and the stop 120 at the other end define the proper and precise endwise disposition of the sealing strip in its relation to the can, holding it, in other words, centrally disposed with relation thereto.

The combined sets of feed rolls 106, 107; 108, 109 are driven as follows: Arranged upon the shaft 53 is a sprocket wheel 121. Connecting with this wheel is a sprocket chain 122 which connects with a sprocket wheel 123 upon a cam shaft 124 journaled to turn in hangers 125 fixed to the under side of the table of the machine. The shaft 124 bears upon its end affixed thereto a gear 126 (see Fig. 13). This gear engages a gear 127 idly turning upon a stud 128 fixed to the frame. The gear 127 has fixed to its side a disk 130 which has the same axis as the gear. Projecting from this disk at a point adjacent the peripheral edge thereof is a pin 131 which engages a slotted lever 132 by entering the slot 133 therein. This lever is pivoted to a stud 134 fixed to the frame of the machine at a point below the gear 127 and projects upwardly some distance above this gear, the adaptation and arrangement of the parts being such that as the gear is rotated it will operate as a crank to reciprocate the lever 132 with a forward and backward movement. At its upper end the lever 132 is pivotally secured by a pin 133' to the end of a rack bar 134' for imparting a longitudinal forward and return movement thereto (see Fig. 18). This rack bar is horizontally disposed and mounted to slide within a bracket 135 fixed to the table of the machine. Engaging the toothed edge of the rack bar is a gear 136 mounted to turn idly upon a stud 137. The gear 136 has engagement with an idler gear 138 mounted upon a shaft or stud 140 fixed to and projecting from the under side of the table, the gear being held in place by a bearing 141 fixed to the end of the shaft and extending therefrom to support the stud 137 of the gear 136 (see Fig. 18). Mounted idly upon the same shaft 140 is a gear 142 having fixed to it a ratchet wheel 143 which lies between the gears 138 and 142 and like them turns idly upon the shaft 140. Pivoted to the side of the gear 138 is a spring-pressed pawl or dog 144 which engages the toothed edge of the ratchet wheel for rotating this wheel and the gear 142 to which it is fixed as the gear 138 is rotated in one direction, or passes idly over the same as the gear 138 is rotated in a reverse direction. The gear 142 is a relatively large gear, the toothed edge thereof engaging both of the gears 111 of the respective sets of feed rolls for operating these rolls as the gear 142 is turned. According to the arrangement of these parts the gear 142 would be rotated for operating the feed rolls during each dwell of the carriers and cans, through the mechanism connecting therewith and with the shaft 53 as aforesaid, a partial rotation only of the gear 142 being effected which is sufficient to operate the feed rolls and feed the strip a proper amount. During this operation the rack bar 134' has both a forward and reverse movement. It is during the forward movement of this bar, as indicated by the arrow thereon (see Fig. 19), that the feeding operation takes place. During the reverse movement of this bar and return to its initial position, the pawl on the gear 138 will pass idly over the ratchet wheel 143.

The combined feed and forming rolls 112, 113 are operated simultaneously with the feed rolls 106, 107; 108, 109 and by the same mechanism that operates the feed rolls. Connection is made as follows: Arranged upon the end of the shaft 110 of the feed roll 108 beneath the table is a sprocket wheel 146. Arranged also upon the end of the shaft 115 of the combined feed and forming roll 113 beneath the table is a sprocket wheel 147. These wheels are connected by a sprocket chain 148 (see Fig. 24). By means of these connected parts motion applied for operating the feed rolls will also operate the combined feed and forming rolls through the intermeshing gears 116 arranged upon the respective shafts thereof as aforesaid, all the sets of rolls being turned simultaneously and an equal amount.

According to the arrangement shown, the main strip is severed by the cutting mechanism at the end of the feed. Provision accordingly made whereby the cutting mechanism may be operated by the rack bar 134' on its forward stroke which defines the end of the feed as aforesaid. The cutting mechanism comprises fixed and movable jaws 150 and 151, respectively (see Fig. 20). These jaws are mounted upon a holder 152 fixed to the table of the machine and through which the strip is fed. Of these jaws the jaw 150 is fixed to the holder, the cutting edge thereof lying just adjacent one side of the strip. The movable jaw 151 projects through the holder on the other side of the strip, being slidably mounted therein and arranged whereby the cutting edge thereof may properly coöperate with the cutting edge of the jaw 150 as the jaw 151 is moved inwardly for severing the strip. Pivotally secured to the end of the jaw 151 is a lever 153 which extends through the table and is fulcrumed to the table. This lever is tensionally retained by a spring 155 whereby the jaw 151 controlled by it may occupy a normal operative position, or position where the cutting edge thereof will lie just adjacent the strip in position for severing the same as the lever is turned and the cutting jaw 151 moved inwardly. A stop 156 defines the normal position of the lever and against which it is held by a spring. Projecting from the end of the lever is an arm 157 which lies within the path of the rack bar 134 where it may be struck by the end of the bar at the termination of its forward movement, the lever being turned thereby, which operates the jaw 151 to cut the strip. As the rack bar 134' returns to its initial position the cutting mechanism will be returned by the spring to its normal operative position as aforesaid.

During the dwell of the carriers the oppositely-arranged wrapping members 18, 18' which apply the ends $a^4$, $a^5$ of the strip to the rear flanged end of the can, are operated as follows: These members, as will be observed, slide upon the table on guides 160 fixed thereto. Pivotally connecting with the rear end of these members are cam levers 161. These levers extend downwardly through the table and are pivoted thereto at the points 162. The levers are operated for imparting movement to the respective wrapping members by means of a cam 163 having slots 164 therein in which the ends 165 of the levers are contained to slide. The cam 163 is borne by the shaft 124 and turns therewith. Inasmuch as this shaft is turned through the clutch connection only during the dwell of the carriers, the wrapping members 18, 18' will accordingly be actuated only during the time of such dwell, the slots in the cam being so cut that as the cam is rotated the wrapping members will be moved from a starting position (shown in Fig. 5) to a position where they have applied the ends $a^4$, $a^5$ of the strip to the can (shown in Fig. 6) and are then returned to their original position during the same revolution of the cam and as it is completing the same. The slots 164 are also so cut that the wrapping member 18, or that applying the underlapping end $a^4$ of the strip to the can, will have completed its operation and will also have had a slight reverse movement. After such reverse movement the member 18', which applies the overlapping end $a^5$ of the strip to the can and which has lagged, will then complete its operation, and afterward both members be returned to their initial positions.

The press or presses are operated directly off the shaft 53 which turns only during the dwell of the carriers as aforesaid (see Fig. 9). For this purpose the shaft 53 is bent or otherwise formed to provide cranks 166. Connecting with the shaft at the points of these cranks are crank arms 167 which connect with the plungers 32 of the respective presses through interposed link connections 168. The connections 168 are pivotally secured to the respective plungers in order to compensate for the motion of the crank. In order that the plungers and presser members carried by them may be adjusted with relation to the crank or shaft 53 operating the same, the connections 168 are adjustably secured to the respective crank arms 167 by means of adjusting nuts 169 which connect the respective arm and link connections by engaging right and left threads cut upon the adjacent ends of these parts.

It is apparent that the construction of the machine hereinbefore described may be varied without departing from the essential principles involved.

What we claim as our invention is:—

1. A can sealing machine for applying a sealing strip to the laterally-projecting and overlapping edges of a can body and cover, the same comprising a carrier for the cans having a progressive movement, strip holding members between which the can passes as it is borne by the carrier during the advance movement thereof whereby a strip held by said members in the path of said laterally-projecting and overlapping edges of the can body and cover may, by the advance movement of the carrier between said members, become bent around and applied to said edges, other movable members assisting in the application of the sealing strip to said edges, and means for operating said carrier and strip applying members with a proper relative sequence of operation.

2. A can sealing machine for applying a sealing strip to the laterally-projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, other movable members assisting in the application of the strip to said overlapping edges, means for operating said carrier to have a progressive and intermittent movement as aforesaid, and means for operating said movable members to assist in the application of said strip during a dwell of the carrier following an advance movement thereof.

3. A can sealing machine for applying a sealing strip to the laterally projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, movable strip applying members assisting in holding and applying the ends of said strip to said overlapping edges, means for operating said carrier to have a progressive and intermittent movement as aforesaid, and means for operating said movable strip applying members during the dwell of the carrier following an advance movement thereof, to have a variable motion, whereby they may bend and apply the ends of said strip to said edges to overlap thereon.

4. A can sealing machine for applying a sealing strip to the laterally-projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, movable strip applying members assisting in the application of the strip to said edges, a press for pinching said strip onto said edges after its initial application thereto, and means for operating said carrier, strip applying members and press with a proper relative sequence of operation.

5. A can sealing machine for applying a sealing strip to the laterally-projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism for feeding the strips to said strip holding members to lie between the same and a can borne by said carrier to lie in the path of the can during the advance movement of the carrier, and means whereby said strip feeding mechanism and said carrier may be operated to have a proper relative sequence of operation.

6. A can sealing machine for applying a sealing strip to the laterally-projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism for feeding the strips to said strip holding members to lie between the same and a can borne by said carrier in the path of said can during the advance movement of the carrier, other movable members assisting in the application of the strip to said overlapping edges, and means whereby said feeding mechanism, carrier and movable strip applying members may be controlled to have a proper relative sequence of operation.

7. A can sealing machine for applying a sealing strip to the laterally-projecting and overlapping edges of a can body and cover, the same comprising a carrier for the cans having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism, strip applying members assisting in the application of the strip to said overlapping edges, a press for pinching said strip onto said edges after its initial application thereto, and means for operating said feeding mechanism, strip applying members and press with a proper relative sequence of operation.

8. A can sealing machine for applying a sealing strip to the laterally-projecting and overlapping edges of a can body and cover, the same comprising a carrier for the cans having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism, movable strip applying members assisting in the application of the strip to said overlapping edges, a press for pinching said strip onto said edges after its initial application thereto, means whereby said carrier may be moved with a progressive and intermittent movement, and means whereby said feeding mechanism, strip applying members and press may be operated during the dwell of said carrier.

9. A can sealing machine for applying a sealing strip to the laterally-projecting and overlapping edges of a can body and cover, the same comprising a carrier for the cans having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism, movable strip applying members assisting in the application of the strip to said overlapping edges, a press for pinching said strip onto said edges after its initial application thereto, a primary continuously-operating driving mechanism, means for operating said carrier from off said driving mechanism to have a progressive movement with intermittent periods of dwell, and means for operating said feeding mechanism, strip applying members and press from off said driving mechanism during the dwell of said carrier.

10. A can sealing machine for applying a sealing strip to the laterally-projecting and overlapping edges of a can body and cover, the same comprising a carrier having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, and a strip feeding and forming mechanism adapted to fold a strip into U form in cross section and to feed the strip to said holding members in a position where said strip may embrace the overlapping edges of a can and cover and become bent around said edges as the can passes between said members during the advance movement of the carrier.

11. A can sealing machine for applying a sealing strip to the laterally-projecting and overlapping edges of a can body and cover, the same comprising a carrier for the cans having a progressive movement with intermittent periods of dwell, strip holding members oppositely arranged and between which the can passes as it is borne by the carrier during the advance movement thereof whereby a strip held by said members in the path of the laterally-projecting and overlapping edges of the can body and cover may, by the advance movement of the carrier, become bent around and applied to said overlapping edges, a strip feeding mechanism adapted to feed a blank strip, a strip severing mechanism for severing a piece from the blank strip, a strip forming and feeding mechanism adapted to bend the severed strip into a substantial U form in cross section and feed the same to said strip holding members to lie between the same and the overlapping edges of the can body and cover as aforesaid, means for operating said carrier with a progressive and intermittent movement, means for operating said strip feeding mechanism to feed a blank strip a distance substantially equal to that of a severed strip, means for operating the severing mechanism after such feed, and means for simultaneously operating said strip forming and feeding mechanism whereby a severed strip may be fed to said holding members during the dwell of the carrier.

12. In a can sealing machine for applying a sealing strip to the laterally-projecting and overlapping edges of a can body and cover, the combination with a table, of a carrier for the cans having a progressive and intermittent movement over and around said table, means for supporting the cans on said carrier to be borne thereby during the advance movement thereof, and strip holding members oppositely arranged upon said table and between which the can passes as it is borne by the carrier during its advance movement whereby a strip held by said members in the path of the laterally-projecting and overlapping edges of the can body and cover may, by the advance movement of the carrier, become bent around and applied to said overlapping edges of the can.

13. In a can sealing machine for applying a sealing strip to the overlapping edges of a can body and cover, the combination with a can support, of spaced strip holding members oppositely arranged whereby a strip held thereby may become bent around and laterally applied to the overlapping edges of a can passed between said members, means for effecting a relative movement between said can support and strip holding members whereby a can may be passed between said members, means for completing the lateral application of the strip to said overlapping edges around the can, and means for pinching the strip onto said overlapping edges after its initial application thereto as aforesaid.

14. In a can sealing machine for applying a sealing strip to the laterally projecting and overlapping edges of a can body and cover, the combination with a can support, of strip holding members having grooved faces adapted to contain a sealing strip having a substantially U-shaped cross section, said strip holding members being spaced and oppositely arranged whereby the overlapping fore edges of the can body and cover may enter the groove in that portion of the strip lying between said members and said strip become bent around and laterally applied to the overlapping edges of said can body and cover passed between said members, and means for effecting a relative movement between said can support and said strip holding members whereby a can may be passed between said members and the strip applied thereto as aforesaid.

15. In a can sealing machine for applying a sealing strip to the laterally-projecting and overlapping edges of a can body and cover, the combination with a table, of a carrier for the cans adapted to pass over said table, strip holding members oppositely arranged on said table and between which the carrier and cans borne by it are adapted to pass, movable strip applying members likewise borne by said table, oppositely arranged, the same being provided with grooved ends between which the can passes during the operation of the carrier, means for operating said carrier, and means for operating said strip applying members.

16. In a can sealing machine for applying a sealing strip to the laterally projecting and overlapping edges of a can body and cover, the combination with a carrier for the cans, strip applying members and press, of a primary driving mechanism, means for operating said carrier from off said mechanism to have a progressive intermittent movement, a crank shaft for operating said press, a cam shaft and connecting mechanism for operating said movable strip applying members during the rotation of said crank shaft, and means whereby said crank shaft may be rotated from off said primary driving mechanism during the dwell of the carrier.

17. In a can sealing machine for applying a sealing strip to the laterally-projecting and overlapping edges of a can body and cover, the combination of a carrier for the cans, movable strip applying members, a primary driving mechanism, means for operating said carrier from off said driving mechanism with a progressive movement having intermittent periods of dwell, a cam shaft, a cam and parts controlled thereby for operating said strip applying members, and means whereby said cam shaft may be rotated during the dwell of the carrier.

18. In a can sealing machine for applying a sealing strip to the laterally-projecting and overlapping edges of a can body and cover, the combination of a carrier, movable strip applying members, a press, a primary driving mechanism, means for operating said carrier from off said mechanism to have a progressive movement with intermittent periods of dwell, a crank shaft, a clutch whereby said crank shaft may be connected with said primary driving mechanism to be rotated thereby during the dwell of the carrier, means for operating said press from off said crank shaft, and means whereby said movable strip applying members may be operated during the rotation of said crank shaft.

19. In a can sealing machine of the type specified, the combination of a carrier, strip holding members oppositely arranged and between which the carrier is adapted to pass, feeding mechanism for feeding a strip to said strip holding members to lie between the same and a can borne by the carrier, a primary driving mechanism, means for operating said carrier from off said driving mechanism with a progressive movement having intermittent periods of dwell, and means whereby aid feeding mechanism may be operated from off said driving mechanism.

20. In a can sealing machine of the type specified, the combination of a carrier, strip holding members oppositely arranged and between which the carrier is adapted to pass, a strip feeding mechanism comprising separate sets of feed rolls, a strip feeding and forming mechanism arranged forward of said feeding rolls and adapted to form a strip fed thereto from said feed rolls and feed the same to said strip holding members, a cutting mechanism, a primary driving mechanism for operating said carrier with a progressive movement having intermittent periods of dwell, means whereby said strip feeding rolls and cutting mechanism may be operated during the dwell of the carrier from off said primary driving mechanism, and means for operating said combined feeding and forming rolls.

21. In a can sealing machine of the type specified, the combination of a carrier for the cans having a progressive movement with intermittent periods of dwell, strip holding members arranged just forward of a can held by said carrier when occupying a position of dwell, strip applying members arranged forward of said strip holding members and adjacent a can borne by said carrier when occupying a position of dwell, and a press arranged forward of said strip applying members and adjacent the position of a can borne by said carrier when occupying a position of dwell, means for operating said carrier to have a progressive movement with intermittent periods of dwell, and means for simultaneously operating said strip applying members and said press whereby they may be operated simultaneously upon separate cans borne by said carrier.

22. In a can sealing machine of the type specified, the combination of a carrier for the cans having a progressive movement with intermittent periods of dwell, strip holding members arranged just forward of a can held by said carrier when occupying a position of dwell, strip applying members arranged forward of said strip holding members and adjacent a can borne by said carrier when occupying a position of dwell, and a press arranged forward of said strip applying members and adjacent the position of a can borne by said carrier when occupying a position of dwell, a feeding mechanism by which a strip may be fed to said holding members, means whereby the carrier may be operated to have a progressive intermittent movement, and means for simultaneously operating said strip feeding mechanism, strip applying members and press during each dwell of the carrier.

23. In a can sealing machine of the type specified, the combination of a table, a carrier for the cans movable on said table with a progressive movement and intermittent periods of dwell, means whereby a sealing strip may be bent around and initially applied to the overlapping edges of a can and cover borne by said carrier during the progressive movement thereof and dwell following, said means comprising in part movable strip applying members, a press for pinching the strip onto said overlapping edges after its initial application thereto, said press comprising fixed and movable jaws and clamping plates carried thereby for gripping said can during the operation of said press.

24. In a can sealing machine of the type specified, the combination with a table having an opening therein, of an endless carrier for the cans running around and over the face of said table and over said opening, said carrier being provided with displaceable can holding and socket forming members, a press having movable and fixed presser members of which the fixed member is located above said opening in the table, a movable member in said opening to be movable through the same, said members presenting edges coöperating with one another to pinch a sealing strip onto the overlapping edges of the body of the can and cover after the initial application of the strip thereto, each of said presser members having a socket formed in the head thereof, and located therein clamping members yieldingly maintained, the same being adapted to grip the can during the operation of the press, and means for operating said movable presser member.

HANS CHRISTIANSEN.
JOHN P. GUPPEY.

Witnesses:
JOHN E. R. HAYES,
M. E. FLAHERTY.